US008905206B2

United States Patent
Zannier

(10) Patent No.: US 8,905,206 B2
(45) Date of Patent: Dec. 9, 2014

(54) POLYMERIC CRASH BOX FOR A VEHICLE

(75) Inventor: Stefania Zannier, Correzzana (IT)

(73) Assignee: Tres SRL, Turin (TO) (IT)

( * ) Notice: Subject to any disclaimer, the term of this patent is extended or adjusted under 35 U.S.C. 154(b) by 52 days.

(21) Appl. No.: 13/812,919

(22) PCT Filed: Mar. 30, 2011

(86) PCT No.: PCT/IB2011/051368
§ 371 (c)(1),
(2), (4) Date: Jan. 29, 2013

(87) PCT Pub. No.: WO2012/014091
PCT Pub. Date: Feb. 2, 2012

(65) Prior Publication Data
US 2013/0127191 A1    May 23, 2013

(30) Foreign Application Priority Data

Jul. 29, 2010    (IT) .............................. MI2010A1424

(51) Int. Cl.
| | | |
|---|---|---|
| *B60R 19/34* | (2006.01) | |
| *B60R 19/03* | (2006.01) | |
| *F16F 7/12* | (2006.01) | |
| *B60R 19/26* | (2006.01) | |

(52) U.S. Cl.
CPC ........... *B60R 19/34* (2013.01); *B60R 2019/264* (2013.01); *B60R 19/03* (2013.01); *F16F 7/121* (2013.01)
USPC ....... 188/377; 188/371; 293/133; 296/187.03

(58) Field of Classification Search
CPC ........ B60R 19/34; B60R 19/30; B60R 19/03; B60R 19/22; B60R 2019/264; B60R 2019/1866; B60R 2019/1873; F16F 7/121
USPC .......... 188/371, 378, 372, 377; 293/136, 110, 293/122, 133, 132; 296/187.03, 187.09, 296/187.11, 187.01
See application file for complete search history.

(56) References Cited

U.S. PATENT DOCUMENTS

| 3,933,387 A | 1/1976 | Salloum et al. |
|---|---|---|
| 4,029,350 A * | 6/1977 | Goupy et al. ................. 293/110 |

(Continued)

FOREIGN PATENT DOCUMENTS

| DE | 100 07 646 | 8/2001 |
|---|---|---|
| DE | 20 2007 016671 | 2/2008 |

(Continued)

OTHER PUBLICATIONS

International Search Report dated Jun. 1, 2011, corresponding to PCT/IB2011/051368.

*Primary Examiner* — Thomas Irvin
(74) *Attorney, Agent, or Firm* — Young & Thompson

(57) ABSTRACT

A polymeric crash box (10) for a motor vehicle, having a first open frontal extremity (12) and a second rear extremity (14), and besides it includes a substantially alveolar structure (20) having a plurality of channels (30) realized in just one piece which extends internally to the polymeric crash box (10), besides each channel (30) being internally tapered towards the second rear extremity (14). The substantially alveolar structure (20) includes a second plurality of channels (40) realized in just one piece with the plurality of channels (30), besides each channel (40) being internally tapered towards the first open frontal extremity (12). Besides each channel (40) internally tapered towards the first open frontal extremity (12) it is surrounded by channels (30) internally tapered towards the second rear extremity (14).

15 Claims, 7 Drawing Sheets

(56) References Cited

U.S. PATENT DOCUMENTS

| | | | |
|---|---|---|---|
| 4,890,877 A | 1/1990 | Ashtiani-Zarandi et al. | |
| 5,746,419 A * | 5/1998 | McFadden et al. | 267/140 |
| 5,806,889 A * | 9/1998 | Suzuki et al. | 280/748 |
| 6,270,131 B1 * | 8/2001 | Martinez et al. | 293/132 |
| 6,312,028 B1 | 11/2001 | Wilkosz | |
| 6,472,043 B1 * | 10/2002 | Kobayashi et al. | 428/116 |
| 6,481,920 B1 | 11/2002 | Leonhardt et al. | |
| 7,093,866 B2 * | 8/2006 | Toneatti et al. | 293/133 |
| 7,934,587 B2 * | 5/2011 | Thenier et al. | 188/371 |
| 8,096,604 B2 | 1/2012 | Asenkerschbaumer et al. | |
| 8,336,933 B2 * | 12/2012 | Nagwanshi et al. | 293/132 |
| 8,474,583 B2 * | 7/2013 | Nagwanshi et al. | 188/371 |
| 8,579,362 B2 * | 11/2013 | Di Modugno | 296/187.03 |
| 2013/0193699 A1 * | 8/2013 | Zannier | 293/133 |

FOREIGN PATENT DOCUMENTS

| | | | |
|---|---|---|---|
| EP | 1 001 091 | 5/2000 | |
| EP | 1 104 857 | 6/2001 | |
| GB | 2 220 612 | 1/1990 | |
| JP | 9 048301 | 2/1997 | |
| WO | WO 2010103449 A1 * | 9/2010 | B60R 19/34 |

* cited by examiner

POLYMERIC CRASH BOX FOR A VEHICLE

The present invention refers to a polymeric crash box for a vehicle, which can be applied in the automotive field and in particular can be used as a sacrificial element in a bumper structure of a motor vehicle.

Typically a crash box is able to absorb a portion of kinetic energy during a crash of the motor vehicle against an obstacle fixed or mobile.

In particular the present invention refers to a crash box of polymeric type, of the type realized in particular through injection molding and having a substantially alveolar structure, in such a way to have a good impact strength resistance and high rigidity, together with a reduced weight.

Each crash box has a first frontal extremity which stands for first the crash, and a second rear extremity, which is constrained to a frame of the vehicle.

Each crash box is in fact designed in order to have in case of a crash a permanent plastic deformation and a programmed collapse starting from a frontal portion towards a second rear portion of the same, consequently determining a plurality of folding towards said second rear portion.

In this way each crash box is able to absorb and progressively dissipate a portion of kinetic energy through plastic deformation and by the propagation of said plurality of folding, maintaining a reduced weight and volume.

A disadvantage of the polymeric crash boxes is that, in case of an impact force angled with respect to the first frontal extremity, a bending moment is determined, which compromises the stability and often determines a sudden collapse or a deformation of the rear portion of the crash boxes, compromising their correct function during the crash itself.

Another analogous disadvantage is that in case of a collapse of a support element, constrained to said second rear extremity, it determines an intensification of the stresses on said second rear extremity, compromising the functionality of the crash-box. This happens also in this case as the plurality of folding starts from said second rear extremity.

Purpose of the present invention is that to realize a polymeric crash box for a vehicle which permits to reduce the production costs and permits to obtain a substantially constant collapsing force during a crash, by maintaining at the same time a high stability.

Another purpose is that to realize a polymeric crash box for a vehicle, which permits to increase the printable size of the same.

Still another purpose is that to realize a polymeric crash box for a vehicle which permits a great reduction of the cost of the injection moulding machines.

Another purpose is that to provide a polymeric crash box for a vehicle, which is easy to realize and economically advantageous.

These purposes according to the present invention are reached by realizing a polymeric crash box for a vehicle as shown in claim 1.

Further features of the invention are highlighted in the following claims.

The features and the advantages of a polymeric crash box for a vehicle according to the present invention will be more evident from the following description, as exemplary but non limitative, with reference to the attached schematic drawings, in which.

Figure 1:
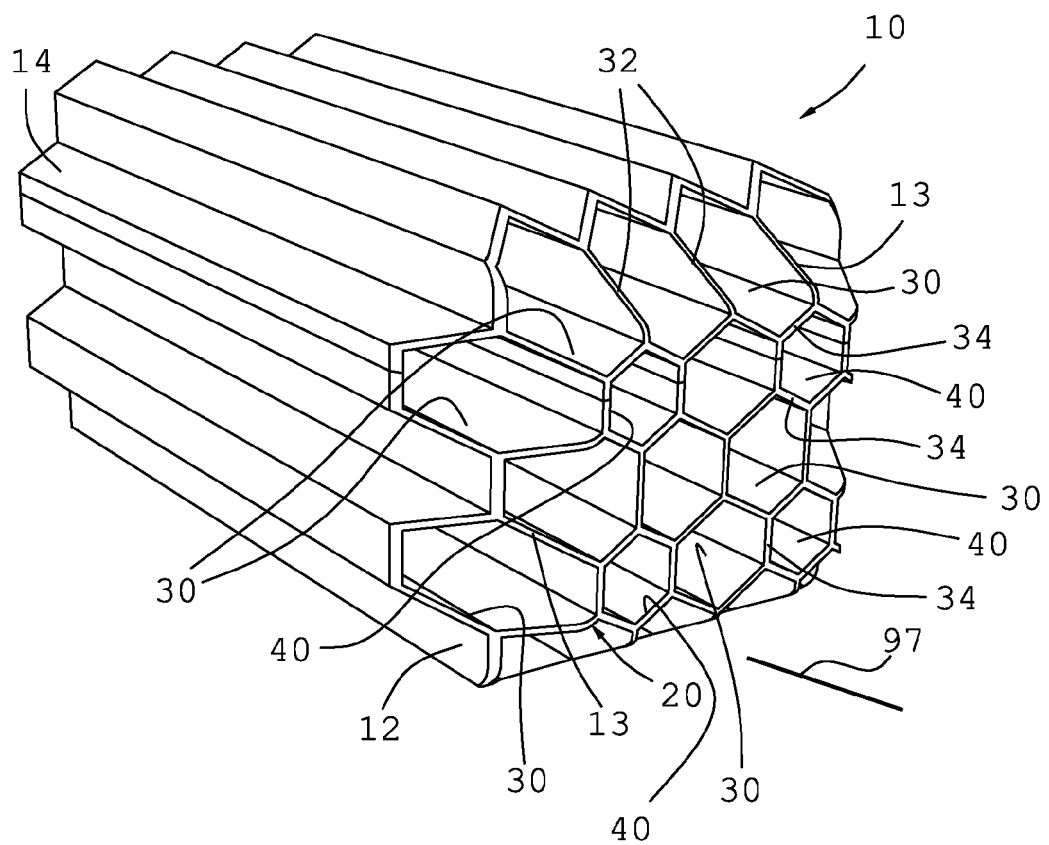
FIG. 1 is a raised top lateral side perspective view of a preferred embodiment of a polymeric crash box according to the present invention.

With reference to the figures, a polymeric crash box 10 for a motor vehicle is shown, realized in a polymeric material, in particular with high elastic module and having a first open frontal extremity 12 and a second rear extremity 14.

Said crash box 10 also comprises a substantially alveolar structure 20 having a plurality of channels 30 realized in a single piece of a polymeric material, each of them being preferably provided with a substantially hexagonal structure.

Said plurality of channels 30 extends internally of said crash box 10 starting from said first frontal extremity 12 open towards said second rear extremity 14, furthermore each channel 30 of said plurality of channels 30 being internally tapered towards said second rear portion 14 and preferably having an inner rake.

According to the present invention, said substantially alveolar structure 20 has a second plurality of channels realized in a single piece with said plurality of channels 30, by injection moulding.

Said second plurality of channels 40 extends from said second rear extremity 14 towards said open frontal extremity 12, furthermore each channel 40 of said second plurality of channels 40 being internally tapered towards said first open front extremity 12 and preferably having an inner rake.

Preferably each channel 40 comprises only a plurality of second walls 34 each of which is inclined with respect to a longitudinal axis 95 of each channel 40.

Advantageously in this way it is possible to reduce the extraction force of said polymeric crash box 10 from a mould at the end of the injection moulding step, by keeping at the same time a good stability of said polymeric crash box 10 during an impact.

A high extraction force represents a great problem for the realisation of polymeric crash boxes 10 as it does not permit to realise pieces of great size having greater shock-absorbing capacities.

Advantageously in this way it is possible to realize a polymeric crash box 10 simple to realise and with a reduced production cost, as it needs a very smaller and less expensive injection moulding machine because it does not need very powerful extraction means.

Alternatively and advantageously this permits to mould at the same time two polymeric crash boxes 10 in the same mould, by keeping the same extraction force of just one polymeric crash box not having said second plurality of channels 40, internally tapered towards said first frontal extremity 12.

Preferably each channel 40 of said second plurality of channels 40 is only surrounded by channels 30 of said plurality of channels 30, internally tapered towards said second rear extremity 14.

Advantageously in this way it is possible to further reduce the extraction force from a mould of said polymeric crash box 10 at the end of an injection moulding step.

Advantageously this permits to realise a polymeric crash box 10 having a very wider cross-section without the need of a great extraction force to extract the same from a mould.

In fact in this way is possible to maintain great rakes and at the same time it is possible to obtain a more gradual increase of the resistant section in the direction of said second rear extremity 14 of said substantially alveolar structure 20.

Advantageously by means of said second plurality of channels 40, internally tapered towards said first frontal extremity 12, it is possible to obtain a plurality of walls 34 having a thickness substantially constant along the entire longitudinal length of said polymeric crash box 10.

Preferably each channel 40 of said second plurality of channels 40 is surrounded by at least 3 channels 30, tapered towards said second rear extremity 14.

In particular each channel 40 of said second plurality of channels 40 is surrounded by at least 6 channels, internally tapered towards said second rear extremity 14.

Advantageously this permits to have a plurality of walls 34 with a constant thickness, so permitting a much more gradual increase of the resistant section going towards said second rear extremity 14.

Advantageously this also permits to have an extremely constant collapsing force during an impact, by conferring to said polymeric crash box 10 a high stability during said impact, and permitting at the same time to avoid a rupture or a deformation programmed from said second rear extremity 14.

Said plurality of channels 30 comprises a plurality of walls 32 each of them being at the same time a wall of another channel 30 of said plurality of channels 30, internally tapered towards said second rear extremity 14.

Furthermore, said plurality of channels 30 comprises a plurality of second walls 34 each of them being at the same time a wall of a corresponding channel 40 of said second plurality of channels 40.

Being preferably surrounded only by channels 30, internally tapered towards said second rear extremity 14, each channel 40 is so formed only by a plurality of second walls 34.

Preferably each second wall 34 advantageously has a substantially constant thickness along a longitudinal axis 95, whereas each wall 32 has an increasing thickness towards said second rear extremity 14.

Each channel 40 internally tapered towards said first frontal extremity 12 being surrounded by channels 30 which are internally tapered towards said second rear extremity 14, the total number of second walls 34 is always less than the total number of walls 32.

Advantageously in this way so it is possible to have a resistant section which increases in a much more gradual way towards said second rear extremity 14, so obtaining a much more constant collapsing force of said polymeric crash box 10 during an impact.

Preferably each second wall 34 is substantially inclined with respect to a longitudinal axis 95 of a corresponding channel 40 of an angle whose absolute value is comprised between 0° and 5° and in particular between 0,5° and 2°.

Furthermore this advantageously permits to increase the length of the plurality of channels 30 and 40 without increasing in an excessive way the extraction force.

Preferably each second wall 34 has a substantially constant thickness along said axis 95 of a corresponding channel 40 and it is also substantially inclined with respect to said longitudinal axis 95 of an angle whose absolute value is comprised between 0° and 5° and in particular between 0,5° and 2°.

Advantageously this permits to obtain a reduction of the extraction force of said polymeric crash box 10 from a mould, and also permits to simplify the realization of the same and of the mould.

Preferably each wall 32 with respect to a longitudinal axis 95 of a corresponding channel 30 has a rake whose absolute value is comprised between 0° and 0,2° and in particular comprised between 0° and 0,1°.

This permits to have a gradual increase of the collapsing force of said polymeric crash box 10 as the resistant section from said first front extremity 12 increases by going towards said second rear extremity 14.

Figure 2:
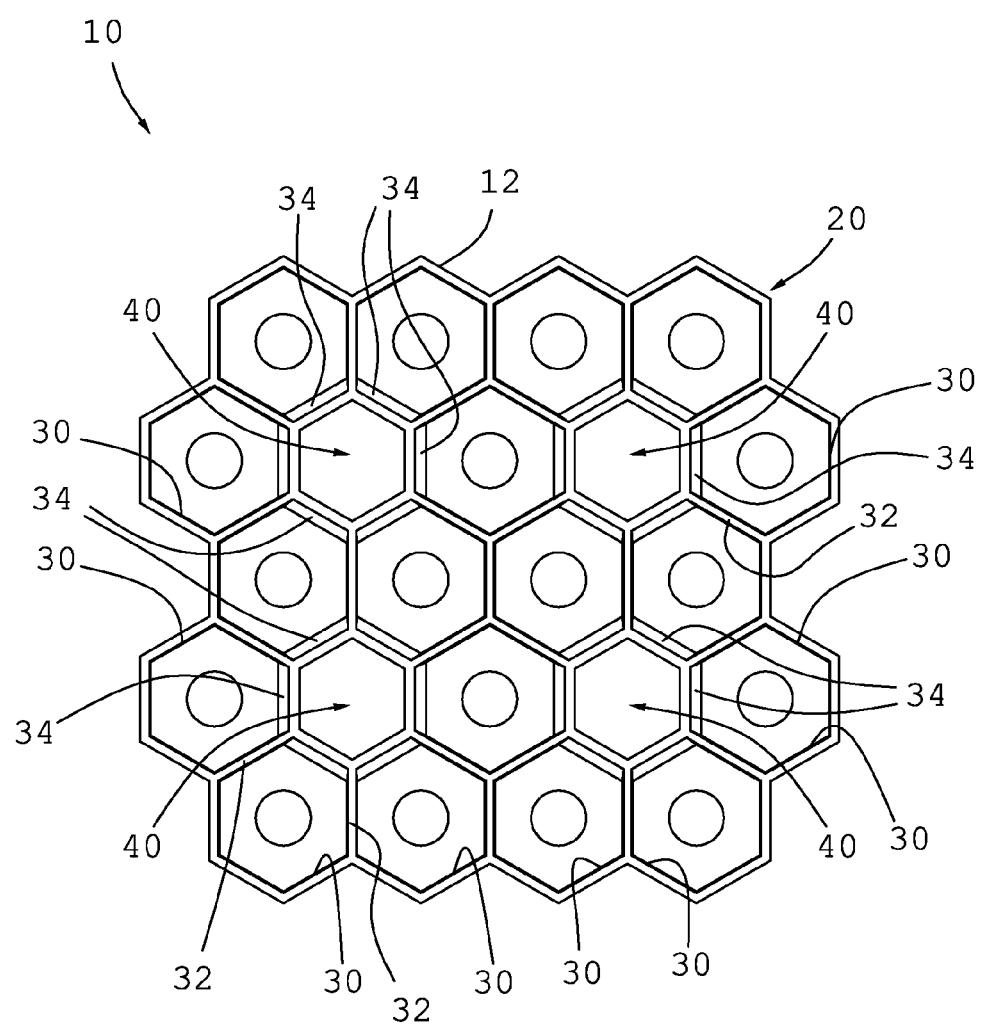
FIG. 2 is a raised (top) frontal view of the polymeric crash box of FIG. 1.
Figure 3:
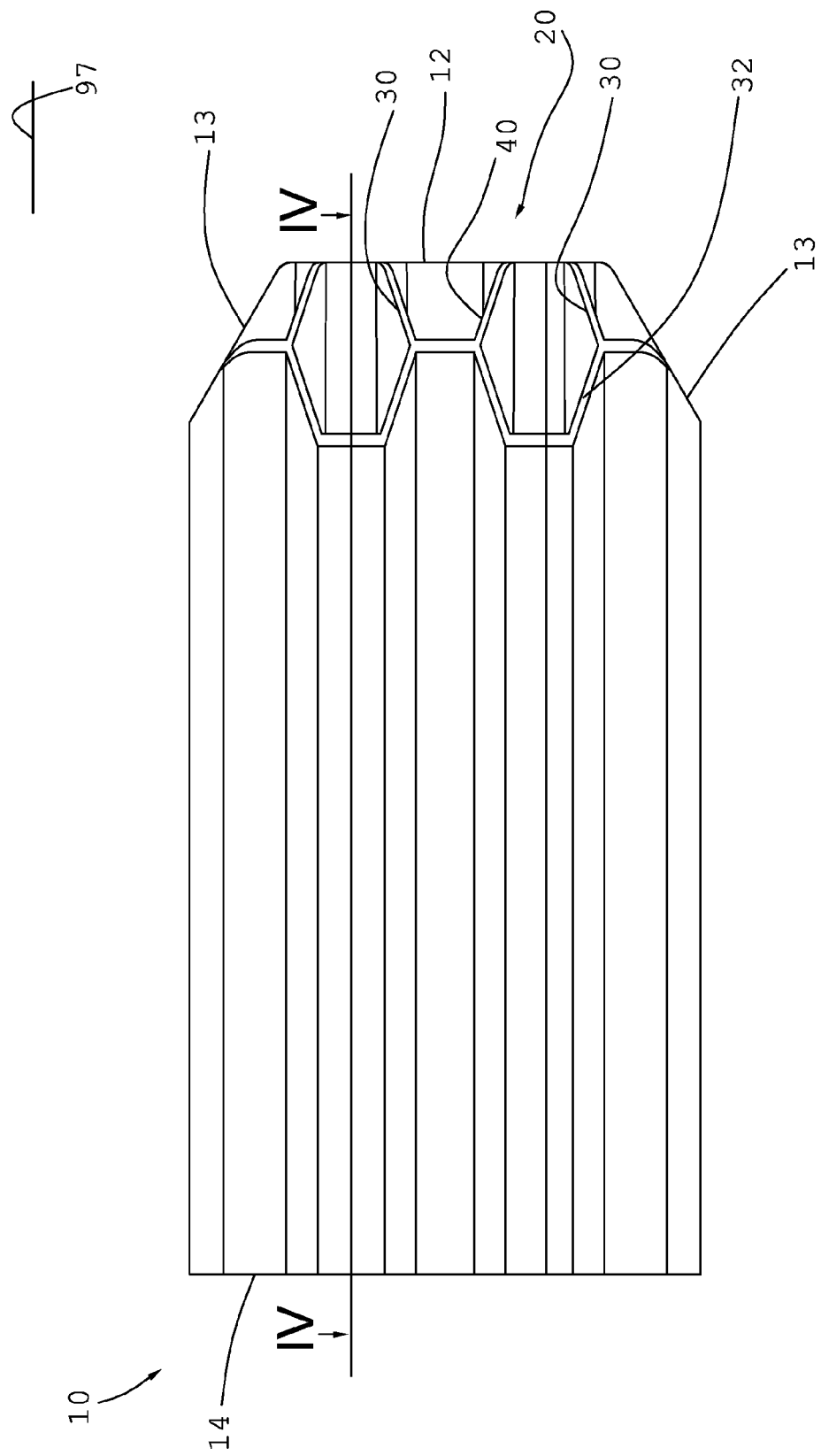
FIG. 3 is a lateral left view of a crash box of FIG. 1.
Figure 4:
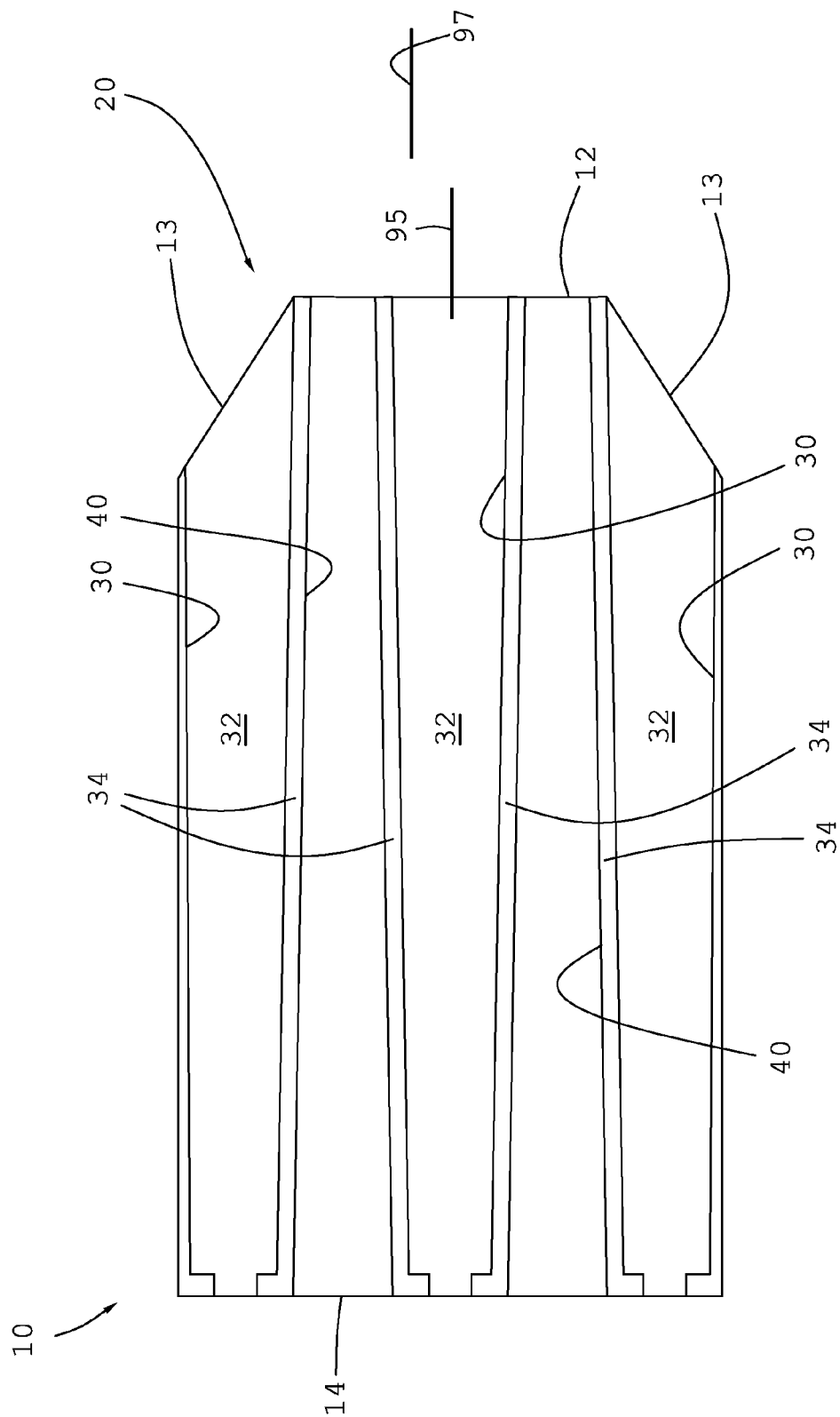
FIG. 4 is a view of a preferred embodiment of a section of the crash box in FIG. 3 sectioned along the line IV-IV.
Figure 5:
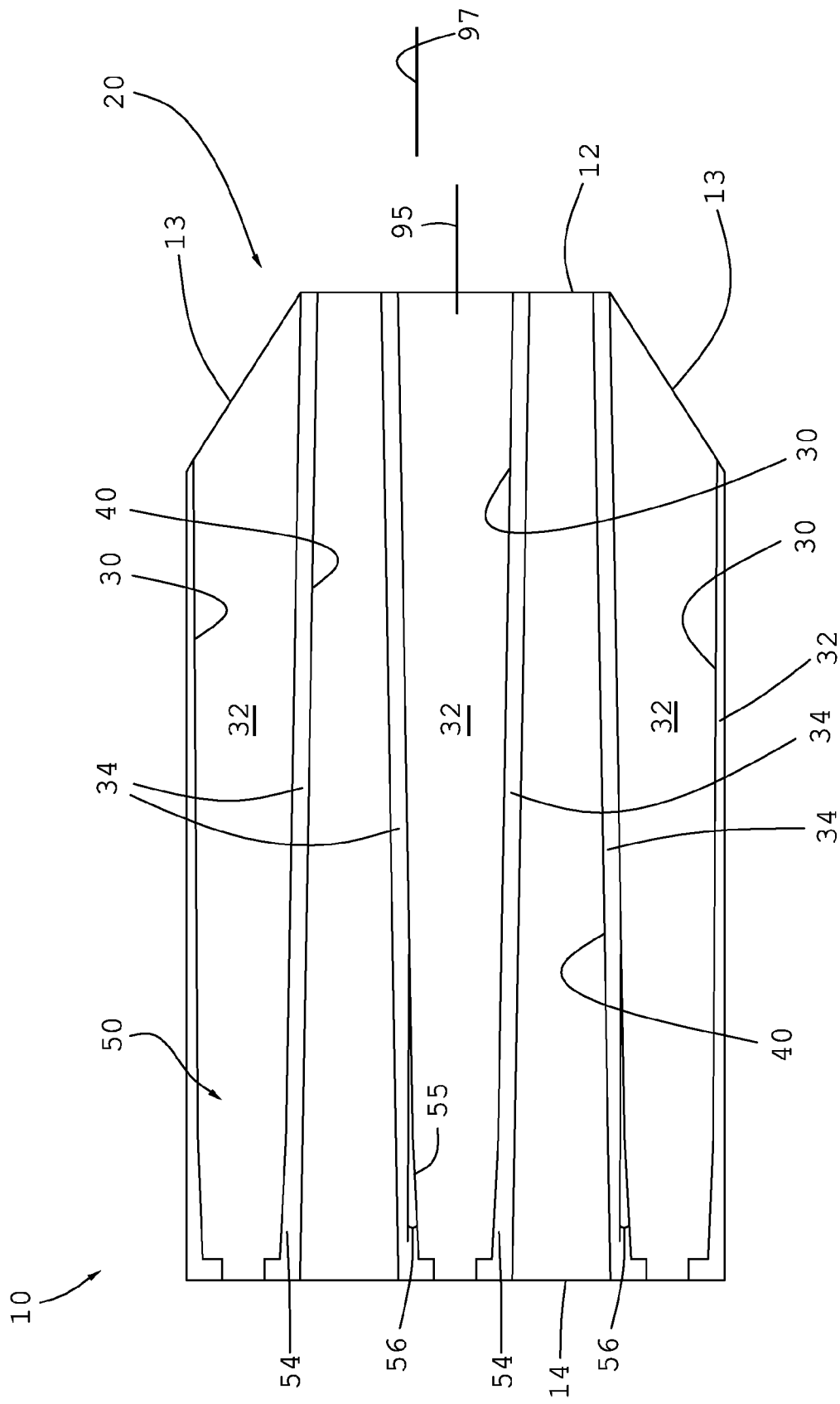
FIG. 5 is a view of another preferred embodiment of a section of the crash box in FIG. 3, sectioned along the line IV-IV.
Figure 6:
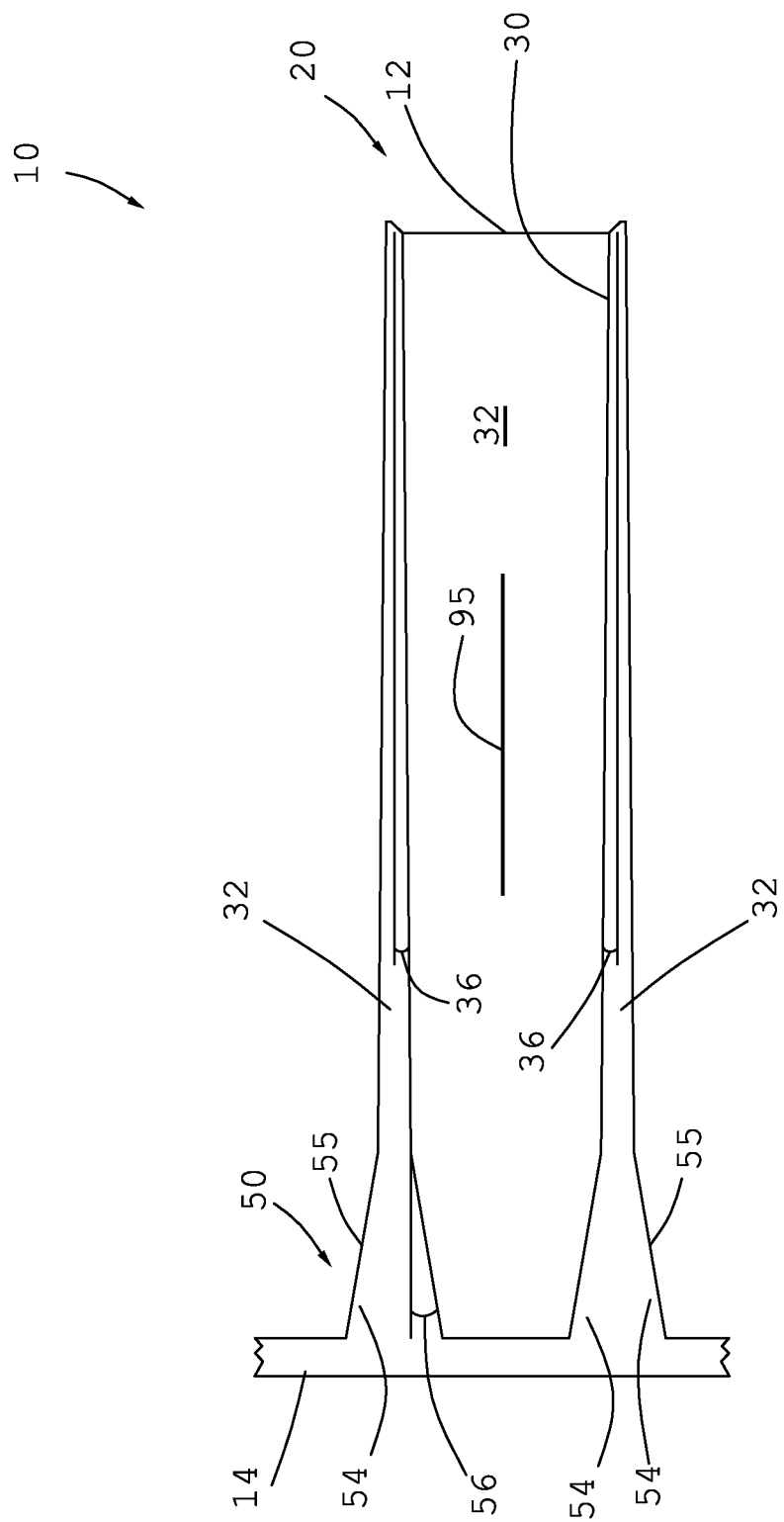
FIG. 6 is a schematic sectioned view according to a longitudinal axis showing a detail of a polymeric crash box according to a preferred embodiment.
Figure 7:
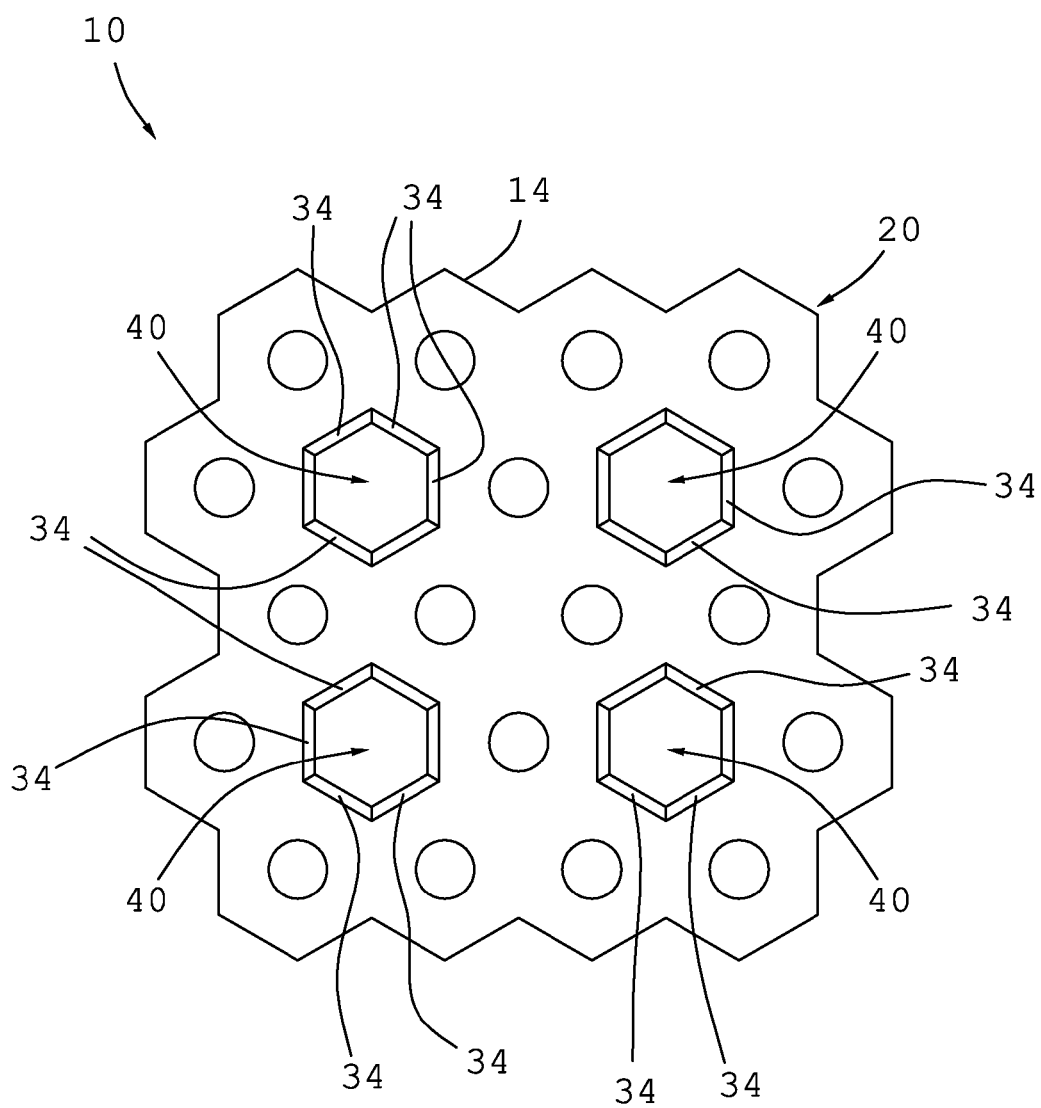
FIG. 7 is a raised (bottom) front rear view of the polymeric crash box in FIG. 1.

Furthermore, with reference to FIGS. 1 and 2, preferably each channel 40 of said second plurality of channels 40 is not placed on the outer lateral periphery of said substantially alveolar structure 20.

Preferably this permits to have great rakes in some channels 30 and 40 mutually adjacent, by permitting a great reduction of the extraction force of said polymeric crash box 10, and at the same time it permits to have a very stable polymeric crash box 10 and able to reduce at a minimum the increase of the resistant section, in direction of said second rear extremity 14, and so it guarantees the most possible constant collapsing force.

Preferably in order to obtain the most possible constant collapsing force during said impact at least a portion of said channels 30 is internally slightly tapered, going towards said second rear extremity 14, and also preferably it has a plurality of walls 32 each of them having a first smaller average rake 36 which, with respect to an axis 95 of a corresponding channel 30 is preferably comprised between 0,01° and 1° and in particular it is comprised between 0,01° and 0,5°.

Advantageously this permits to further stabilize during the impact said first open frontal extremity 12, without excessively increasing its resistance to said impact.

In this way it is possible to determine a plurality of programmed bending, starting from said first open frontal extremity 12 without limiting the capacity of absorption of said crash box 10.

According to a preferred embodiment, at least one portion of said plurality of channels internally has a first smaller average rake 36 starting from the open frontal extremity 12, which has, with respect to an axis 95 of a corresponding channel 30, a value preferably comprised between 0,01° and 1° and still more preferably comprised between 0,01° and 0,5°, and a second greater average rake 56 which is only present at said second rear extremity 14 and furthermore which has with respect to said axis 95 a value preferably comprised between 0,01° and 4° and still more preferably between 0,5° and 2°.

In particular, said second greater average rake 56 is present only at said second rear extremity 14, and at an inner inclined profile 55 which is caused by stiffening means 50 comprising at least one stiffening portion 54 realised in a polymeric material and placed only at said second rear extremity 14, with which said crash box 10 is preferably provided, which is directly injection moulded in a single piece around the same.

Advantageously in this way is possible to realize a polymeric crash box 10 easy to realize and with a reduced production cost.

Preferably at least one part of said plurality of channels 30 is extremely tapered going towards said second rear extremity 14 and it has also externally an average rake which, with respect to an axis 95 of each corresponding channel 30 preferably has a value comprised between 0° and 4° and in particular comprised between 0° and 2°.

Preferably said first open frontal end 12 has a plurality of faces 13 which are inclined and non orthogonal with respect to a longitudinal direction 97 by advantageously permitting to reduce the initial collapsing force in the first instants of said impact.

Said plurality of faces 13 has the function to reduce the initial stress during an impact, in particular in case of an impact force angled with respect to said longitudinal direction 97.

In this way is also possible to always have a surface of a face 13 that is substantially orthogonal to said angled impact force, by consequently obtaining a better distribution of the stress on a greater number of channels 30 of said plurality of channels 30. On the contrary, without said plurality of faces 13 with an angled impact force a distribution of the stresses is determined on a much smaller number of channels 30 by consequently determining a lower absorbing capacity of the impact, as the number of stressed channels 30 would be reduced.

Preferably said crash box 10 comprises fixing means in particular connectable with a frame of said motor vehicle, which are constrained or directly integrated in said second rear extremity 14.

Preferably said fixing means comprise a plurality of holes which are obtained in said second rear extremity 14 and which advantageously permit a total weight reduction of said polymeric crash box 10.

Preferably said crash box 10 also comprises a substantially longitudinal through hole, in order to permit the insertion of a hook which can be utilized in particular to drive a transportation means, which in particular is tapered preferably at said second rear extremity 14 of an angle preferably comprised between 0,01° and 4° and even more preferably between 0,01° and 2°.

This in order to avoid a failure or a plurality of bending starting from said second rear extremity 14.

Preferably said crash box 10 is realized in a single piece, in particular through injection moulding, with a high impact strength polymeric material, which according to an ISO type 180/1A test at 23° C. has a rupture energy of at least 5 KJ/m$^2$ and in particular of at least 10 KJ/m$^2$, which in particular is a polymeric material, preferably chosen among a polymeric mixture of polybutylene-terephtalate and polycarbonate, as for example a polymeric material known with the trademark Xenoy™, and a polymeric mixture of polifenylene-oxide and a poliammidic resin, as for example a polymeric mixture, known with the trademark Noryl™, and/or among polymeric materials having similar features.

Preferably said polymeric material is chosen among: a mixture of a polyfenylene-ether (PPE) and a polyamide (PPE), a mixture of a polyfenylene-ether (PPE) and a poly-buthylene-terephtalate, a mixture of a poly-fenylene-ether (PPE) and a polyethylene (PE), a mixture of a polyfenylene-ether (PPE) and a polypropylene (PP), a mixture of a polyfenylene-ether (PPE) and a polystyrene (PS), a mixture of a polycarbonate (PC) and a poly-butylene-terephtalate (PBT), a mixture of a polycarbonate (PC) and a polyethylene-terephtalate (PET), a polypropylene rubber, a polyamine rubber, and/or their derivatives.

According to another aspect of the present invention, a lateral bumper structure for a vehicle is provided, comprising at least two crash boxes 10 of the previously described type, and each crash box 10 can be inserted inside a corresponding housing, laterally realised in a frame of said vehicle and constrained with the same.

According to another aspect of the present invention, a motor vehicle is provided, comprising a lateral bumper structure, in particular a rear structure of the previously described type.

So it was seen that a polymeric crash box for a vehicle according to the present invention attains to the purposes previously highlighted.

The polymeric crash box for a vehicle of the present invention so conceived is susceptible of various changes and variations, all within the same inventive concept.

Furthermore, in practice, the used materials, as well as their dimensions and components, can be of any kind according to the technical needs.

The invention claimed is:

1. A polymeric crash box (10) for a motor vehicle, said polymeric crash box (10) comprising:
   a substantially alveolar structure (20) with a first open frontal extremity (12) and a second rear extremity (14), said substantially alveolar structure (20) being a molded one-piece structure comprised of i) a first plurality of channels (30), and ii) second plurality of channels (40), said first and second plurality of channels together being a molded one-piece structure,
   wherein said first plurality of channels (30) each have a longitudinal axis (95) and extend internally to said polymeric crash box (10) starting from said first open frontal extremity (12) towards said second rear extremity (14),
   wherein each channel (30) of said first plurality of channels (30) are internally tapered towards said second rear extremity (14),
   wherein said first plurality of channels (30) comprise a plurality of first walls (32), each said first wall (32) being a shared wall of two adjacent channels (30) of said first plurality of channels (30),
   wherein said second plurality of channels (40) extend starting from said second rear extremity (14) towards said first open frontal extremity (12),
   wherein each channel (40) of said second plurality of channels (40) is internally tapered towards said first open frontal extremity (12),
   wherein said first plurality of channels (30) further comprises a plurality of second walls (34) each of which is a wall of a correspondent channel (40) of said second plurality of channels (40), and each channel (40) of said second plurality of channels (40) comprises only a plurality of said second walls (34),
   wherein each second wall (34) has a thickness substantially constant along the longitudinal axis (95), while each first wall (32) has has a thickness growing towards said second rear extremity (14), and
   each second wall (34) is substantially inclined, with respect to the longitudinal axis (95) of a correspondent channel (40) of said second plurality of channels (40).

2. A polymeric crash box (10) according to claim 1, characterized in that each channel (40) of said second plurality of channels (40) is surrounded only by said channels (30) of said first plurality of channels (30).

3. A polymeric crash box (10) according to claim 1, characterized in that each channel (40) of said second plurality of channels (40) is surrounded by at least three (3) of the channels (30) of said first plurality of channels (30).

4. A polymeric crash box (10) according to claim 1, characterized in that each second wall (34) is substantially inclined, with respect to the longitudinal axis (95) of the correspondent channel (40) of said second plurality of channels (40), at an angle with an absolute value between 0° and 5°.

5. A polymeric crash box (10) according to claim 1, characterized in that each said first wall (32), with respect to the longitudinal axis (95) of a correspondent one of said two adjacent channels (30), has a rake angle with an absolute value between 0° and 0.2°.

6. A polymeric crash box (10) according to claim 1, characterized in that a part of said first walls (32) comprises a first minor medium rake angle (36) with an absolute value between 0.01° and 1.0° with respect to the longitudinal axis (95).

7. A polymeric crash box (10) according to claim 1, characterized in that at least a part of said first plurality of channels (30) are externally tapered going towards said second rear extremity (14) and have externally a medium rake angle which respect to the longitudinal axis (95) of each correspondent channel (30) of said first plurality of channels (30) between 0° and 4°.

8. A polymeric crash box (10) according to claim 1, characterized in that said first open frontal extremity (12) includes a plurality of faces (13) which are inclined and not orthogonal with respect to a longitudinal direction (97) of substantially alveolar structure (20).

9. A polymeric crash box (10) according to claim 1, further comprising fixing means connectable to a frame of said motor vehicle which are constrained or directly integrated with said second rear extremity (14), wherein said fixing means comprise a plurality of holes in said second rear extremity (14) providing a reduction of a total weight of said polymeric crash box (10).

10. A polymeric crash box (10) according to claim 1, wherein said substantially alveolar structure (20) is comprised of a polymeric material with high impact strength, which with a test of the type ISO 180/1A at 23° C has a breaking energy of at least 5 KJ/m$^2$, and which is a blend of a polyphenylene ether (PPE) and a polyammide (PA), a blend of a polyphenylene ether (PPE) and a polybutylene terephthalate (PBT), a blend of a polyphenylene ether (PPE) and a polyethylene (PE), a blend of a polyphenylene ether (PPE) and a polypropylene (PP), a blend of a polyphenylene ether (PPE) and a polystyrene (PS), a blend of a polycarbonate (PC) and a polybutylene terephthalate (PBT), a blend of a polycarbonate (PC) and a polyethylene terephthalate (PET), a polypropylene rubber, a polyamide rubber, and/or their derivates.

11. A lateral bumper structure for a vehicle comprising at least two polymeric crash boxes (10) according to claim 1, each polymeric crash box (10) being insertable in a correspondent housing and laterally into a frame of said vehicle and constrained to the frame of said vehicle.

12. A polymeric crash box (10) according to claim 1, wherein said first and second plurality of channels together are an injection molded one-piece structure.

13. A polymeric crash box (10) for a motor vehicle, said polymeric crash box (10) comprising:

a substantially alveolar structure (20) with a first open frontal extremity (12) and a second rear extremity (14), said substantially alveolar structure (20) being a molded one-piece structure comprised of i) a first plurality of channels (30), and ii) second plurality of channels (40), said first and second plurality of channels together being a molded one-piece structure, wherein said first plurality of channels (30) each have a longitudinal axis (95) and extend internally to said polymeric crash box (10) starting from said first open frontal extremity (12) towards said second rear extremity (14), wherein each channel (30) of said first plurality of channels (30) are internally tapered towards said second rear extremity (14), wherein said first plurality of channels (30) comprise a plurality of first walls (32), each said first wall (32) being a shared wall of two adjacent channels (30) of said first plurality of channels (30), wherein said second plurality of channels (40) extend starting from said second rear extremity (14) towards said first open frontal extremity (12), wherein each channel (40) of said second plurality of channels (40) is internally tapered towards said first open frontal extremity (12), and wherein said first plurality of channels (30) further comprises a plurality of constant-thickness second walls (34), each the plurality of second walls (34) being a wall of a correspondent channel (40) of said second plurality of channels (40), and each channel (40) of said second plurality of channels (40) comprises only a plurality of said second walls (34).

14. A polymeric crash box (10) according to claim 13, wherein each second wall (34) is substantially inclined, with respect to the longitudinal axis (95) of a correspondent channel (40) of said second plurality of channels (40), at an angle with an absolute value between 0° and 5°.

15. A polymeric crash box (10) according to claim 13, wherein each said first wall (32), with respect to the longitudinal axis (95) of a correspondent one of said two adjacent channels (30), has a rake angle with an absolute value between 0° and 0.2°, and wherein a part of said first walls (32) further comprises a first minor medium rake angle (36) with the absolute value between 0.01° and 1° with respect to the longitudinal axis (95).

* * * * *